3 Sheets—Sheet 1.

H. P. HENRIKSEN,

Assignor to himself and L. HANSEN.

Machine for Sewing Gloves.

Figure 1:
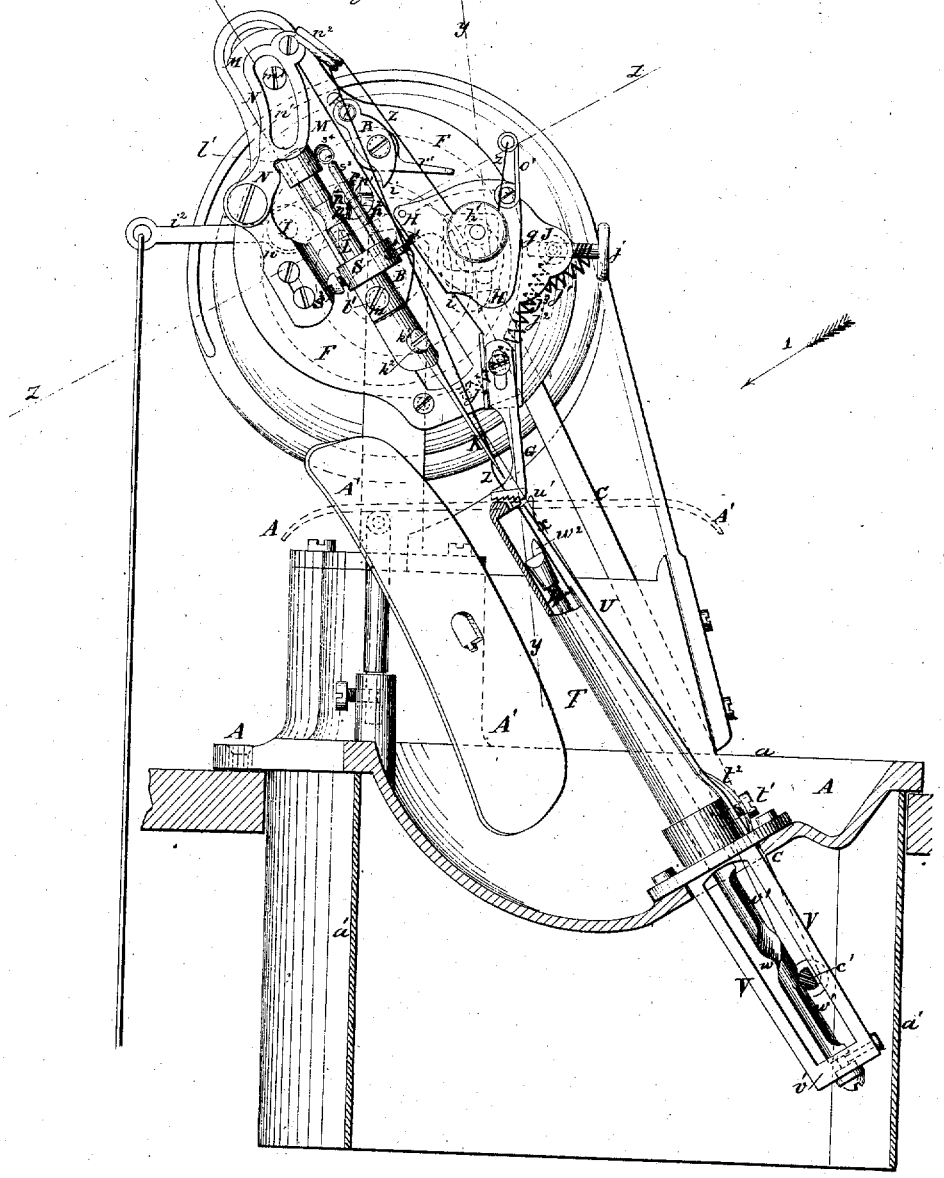

No. 9,039. *Fig. 1* Reissued Jan. 13, 1880.

*Witnesses:*

Siegfried Lindhagen.

[illegible]

*Inventor*

Hans Peter Henriksen by A. W. Almqvist

Attorney.

3 Sheets—Sheet 2.

H. P. HENRIKSEN,

Assignor to himself and L. HANSEN.

Machine for Sewing Gloves.

No. 9,039. Reissued Jan. 13, 1880.

*Witnesses:*
Sigfrid Lindhagen
[illegible]

*Inventor:*
Hans Peter Henriksen
by A. W. Almquist
Attorney.

H. P. HENRIKSEN,
Assignor to himself and L. HANSEN.
Machine for Sewing Gloves.
No. 9,039. Reissued Jan. 13, 1880.
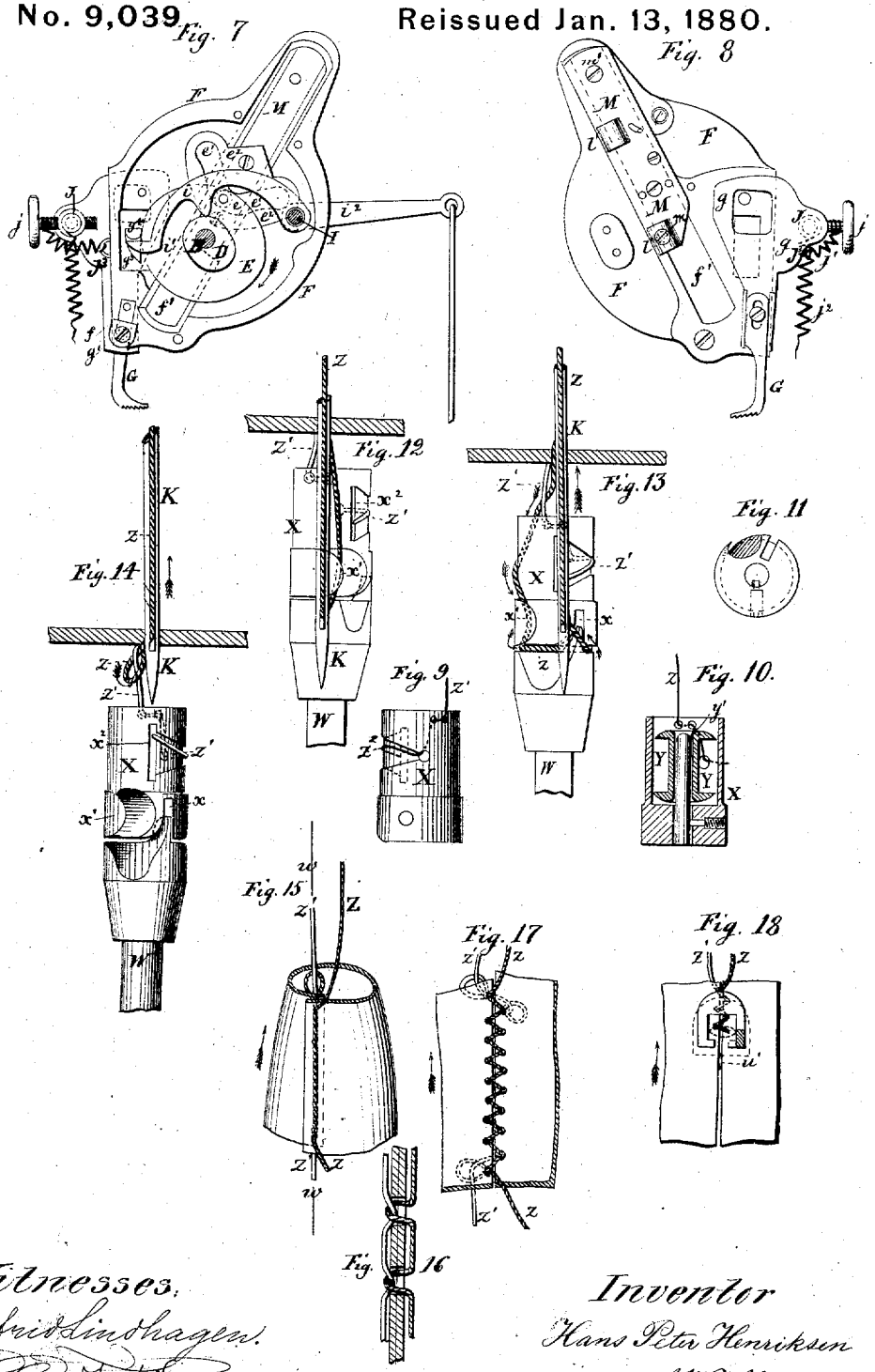
Witnesses,
Sigfrid Lindhagen.
[illegible]
Inventor
Hans Peter Henriksen
by A. W. Almqvist
Attorney.

UNITED STATES PATENT OFFICE.

HANS P. HENRIKSEN, OF COPENHAGEN, DENMARK, ASSIGNOR TO HIMSELF AND LUDVIG HANSEN, OF BROOKLYN, NEW YORK.

MACHINE FOR SEWING GLOVES.

SPECIFICATION forming part of Reissued Letters Patent No. 9,039, dated January 13, 1880.

Original No. 188,515, dated March 20, 1877. Application for Reissue filed May 28, 1879. Patented in Denmark, February 5, 1874.

*To all whom it may concern:*

Be it known that I, HANS PETER HENRIKSEN, of Copenhagen, Denmark, have invented certain new and useful Improvements in Glove-Sewing Machines, of which the following is a specification.

The object of my invention is to produce a glove-sewing machine by which every seam required on a glove can be sewed perfectly and conveniently with either a straight or a zigzag seam and by a lock-stitch.

My invention consists in the combination, in a sewing-machine, of a needle, a presser-foot, a rotary cam for imparting a longitudinal motion to said presser-foot in one direction, another rotary cam for imparting an oscillating motion to said presser-foot in one direction, springs for imparting a longitudinal and an oscillating movement to said presser-foot in the opposite direction, and an adjustable stop moving with said presser-foot and acting against a stationary part of the face-plate of the machine, for limiting the oscillation of said presser-foot, whereby I produce a convenient means for effecting the operation of the presser-foot.

It also consists in the combination, in a sewing-machine, of a face-plate, a needle-bar, means for reciprocating the same, devices for securing a needle eccentrically to the axis of said needle-bar, a crank carried by said needle-bar and provided with a crank-pin extending parallel with said needle-bar, a rotary cam carried bodily up and down with the needle-bar, and provided with a ratchet-wheel or ratchet-teeth, and a pawl arranged to engage with said ratchet-wheel as the latter moves past it to effect the rotation of the cam-wheel and the oscillation of the needle-bar, whereby a convenient machine for making a zigzag stitch is produced.

It also consists in the combination of a hollow horn or post adapted to enter articles to be sewed, a needle extending in the same direction as said horn or post and working through the tip thereof, a shuttle for operating in conjunction with the said needle, and mechanism for operating said needle and shuttle.

It also consists in the combination, in a sewing-machine, of a hollow horn or post extending in the same direction as the needle by which the sewing is to be done, adapted to enter the articles to be sewed and support them on its tip, a shuttle in said horn or post extending axially in the direction of the length of said horn or post, and means for imparting an oscillating motion to the shuttle.

Figure 2:
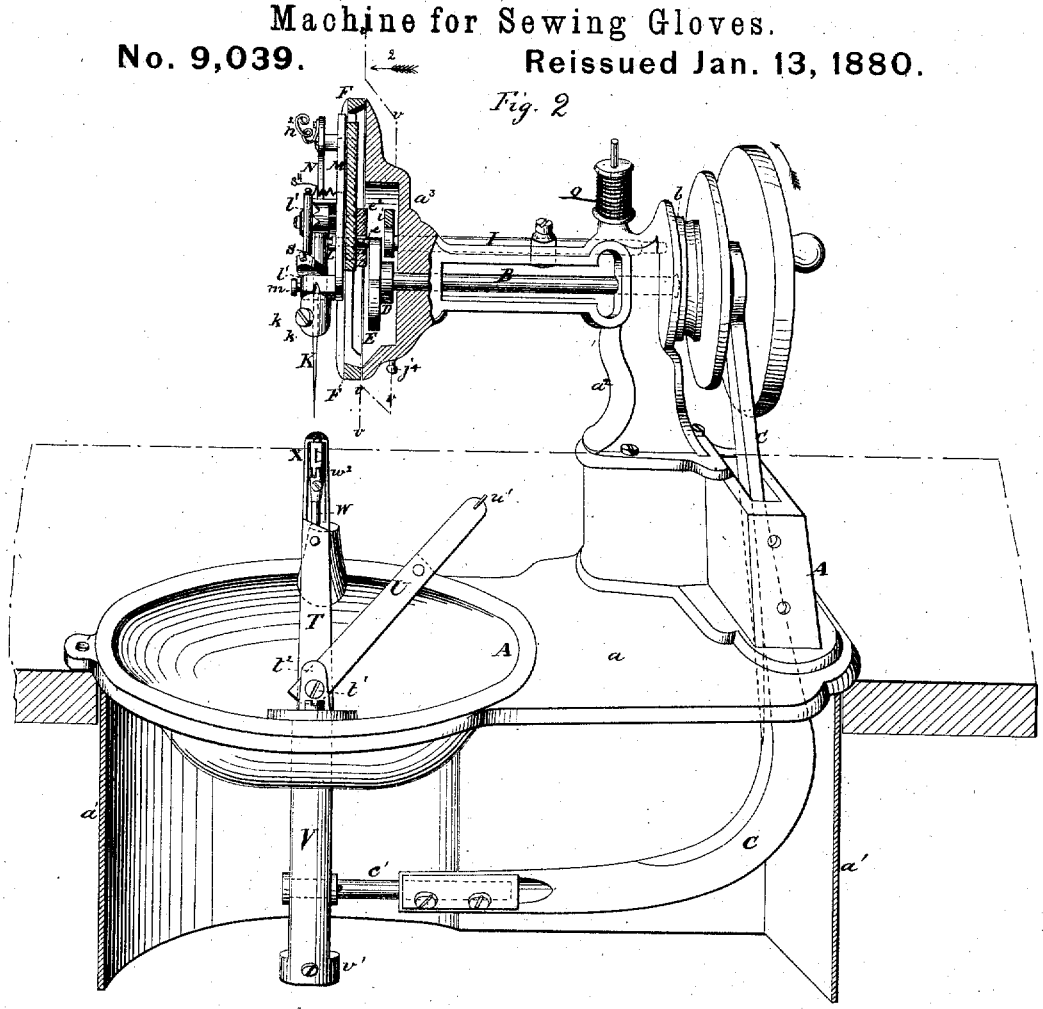
Figure 3:
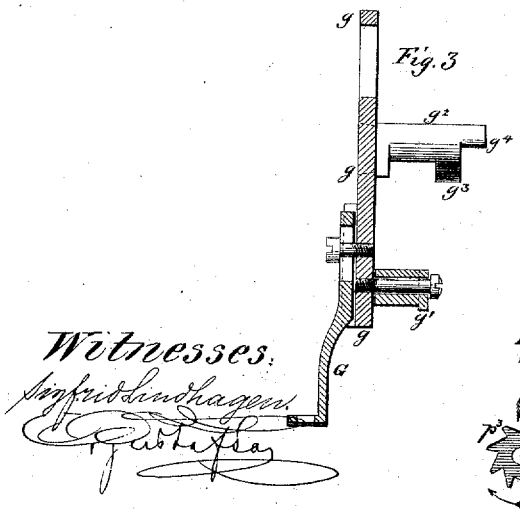
Figure 4:
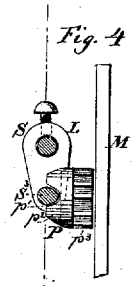
Figure 5:
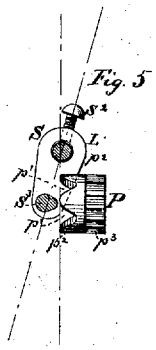
Figure 6:
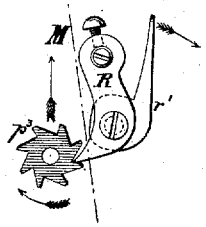

In the accompanying drawings, Figure 1, Sheet 1, is an end elevation, partly in section, of a glove-sewing machine constructed according to my present invention. Fig. 2, Sheet 2, is a perspective view, partly in section, at the line *x x*, Fig. 1, taken from the side where the operator sits, looking in the direction indicated by the arrow 1 on Sheet 1. Fig. 3 is a detail section, through the line *y y* of Fig. 1. of the presser-foot and feeder and the plate to which it is attached. Figs. 4 and 5 are detail sections, through the line *z z* of Fig. 1, of the needle-bar and crank-pin, showing the different positions of the same and of the cam-wheel to produce a straight and zigzag seam. Fig. 6 is a detail of a section of the ratchet and of the pawl and cam-lever for operating the same. Fig. 7, Sheet 3, is a detail section, through the line *v v* of Fig. 2, looking in the direction of arrow 2, showing the reverse inside of the face-plate, with the mechanism for operating the needle, feed, and presser-foot. Fig. 8 is an outside view of the said plate, the needle-bar, ratchet and pawl, and the tension-plate being removed. Fig. 9 is a side view of the shuttle. Fig. 10 is a vertical section of the same and of the spool therein. Fig. 11 is an end view of the lower end of the shuttle. Figs. 12, 13, and 14 are front views of three different relative positions of the shuttle, shuttle-carrier, and needle, exhibiting three different stages of forming the lock-stitch. Fig. 15 represents a portion of a glove-thumb sewed with the straight seam on a lap-joint. Fig. 16 is an enlarged section, illustrative of the said stitch, taken through the line *w w* of Fig. 15. Fig. 17 represents the zigzag stitch on an edge-to-edge joint or a flush joint. Fig. 18 shows two pieces of skin held in position on the finger-table by the presser-foot for edging and joining by the cross-stitch.

Similar letters of reference indicate corresponding parts in the different figures.

A is the frame of the machine, having a horizontal part, $a$, attached by screws onto a table. A casing, $a'$, surrounding the parts of the machinery underneath the frame A, is fitted through a suitable opening in the table. $a^2$ is the upright portion of the frame, provided with a horizontal shaft, B, which may be revolved by treadle motion, in the usual manner, transmitted by a belt or cord to the pulley $b$.

From the shaft B the necessary motion is transmitted to operate the three main essential parts—viz., the feed, needle, and shuttle. On the shaft B are two cams, D E, for the movements of which ample room is provided, in this instance, by recessing an enlargement, $a^3$, of the upright portion $a^2$ of the frame A, which part $a^3$ I will here call the head of the frame A.

F is a face-plate attached to the head $a^3$. It is provided with a slot or slideway, $f$, for guiding the feed and presser-foot, and another slot or slideway, $f'$, for guiding the needle-bar slide.

G is the presser-foot, secured to a plate, $g$, which latter is provided with a swivel slide-block, $g'$, upon which, as a fulcrum, it may oscillate, and which is free to slide in the slot $f$. Said plate has also a rigid block, $g^2$, provided with a toe-piece, $g^3$, and a toe-piece, $g^4$, through which motion is imparted to it in one direction, a spring, $j^2$, being employed to move it in the opposite direction.

The plate $g$ is prevented from side play by being fitted to move closely between the tension-plate H and the face-plate F, the tension-plate H being secured to the face-plate F by a pin and the tension-screw $h'$, the latter passing through an opening in the plate $g$ large enough to allow of a free movement of the last-named plate.

Parallel with the shaft B is fitted a shaft, I, on which is pivoted (see particularly Figs. 2 and 7) a lifting lever or hook, $i$, provided with a toe, $i'$, impinging against the under side of the toe-piece $g^4$ aforesaid, and operated by a cam, D, on the shaft B.

J is a stud (see particularly Figs. 1 and 7) on the back of the plate $g$, through which passes a set-screw, $j$, by the contact of which with the edge of the face-plate F the throw of the feed, and thereby the length of the stitch, is regulated, the latter being susceptible of being increased or diminished by adjusting the screw. A spiral spring, $j'$, connects the screw $j$ with the face-plate F at $j^3$, thereby causing the plate $g$ to move transversely as far as permitted by the set-screw $j$ when not otherwise actuated, and a stronger coiled spring, $j^2$, connects the said stud J with the head $a^3$ of the frame A at $j^4$, and pulls the plate $g$ downward toward the point $j^4$ when it is not otherwise actuated, thereby causing the presser-foot to rest on the horn or post.

These are the necessary details for working the feed and presser-foot. Their operation is as follows: While the needle is in the lowest position, and thus holding the material still on the horn or post, the presser-foot is raised by means of the toe $i'$ on the lifting lever or hook $i$, lifting the plate $g$ through the toe-piece $g^4$, the lifting lever or hook $i$ being impelled upward by the throw of the cam D. At the same time the circular portion of the cam E is in contact with the toe-piece $g^3$, carried by the plate $g$, and retains the same at its greatest distance from the center of the cam-shaft B and the presser-foot in the same elevated position. The presser-foot having been raised the full throw of the cam D, the toe-piece $g^3$ comes in contact with the flattest portion of the revolving cam E, and is drawn by the spring $j'$ nearer the center of the shaft B a distance gaged by the contact of the screw $j$ with the adjacent edge of the face-plate F. The lifting lever or hook $i$ next bears on the periphery of the cam D at its shortest radius, and the presser-foot, actuated by the spring $j^2$, slides downward (guided by the swivel slide-block $g'$ in the inclined slot $f$) and toward the operator, to move plate $g$ and presser-foot G, by acting on the toe-piece $g^3$, away from the center of the shaft B to the extreme end of the throw of the said cam. In this movement the plate $g$ oscillates on the swivel slide-block $g'$ as a fulcrum, thus moving the presser-foot G, while still resting on the material, in a direction away from the operator. The serrated or roughened under side of the presser-foot impinges on and draws or feeds the material with it the desired length of the stitch, and again remains in position on the finger-table while the needle descends and completes the stitch.

From the foregoing it is seen that the presser-foot G accomplishes the two purposes of presser-foot and feeder.

$i^2$ is a lever secured to the shaft I, and from which a cord or connection goes down to a treadle, by treading on which the presser-foot G may be raised at will, leaving the free use of both hands for inserting, shifting, or removing the material on the horn or post.

K is the needle, attached eccentrically to the needle-bar L by being clamped in a groove on the said bar by means of a curved plate, $k'$, held by a set-screw, $k^2$. The needle-bar L is mounted so as to be free to turn in bearings $l'$, attached to or formed as part of a slide, M, which is worked in the slot $f'$ in the face-plate F by a roller, $e$, studded on the side of the cam E. This roller $e$ works in a cam-groove, $e'$, in a plate, $e^2$, secured to the slide M. The cam groove $e'$ is shaped as seen in Fig. 7, comprising two branches, nearly at right angles with each other, coinciding nearly with the path of the roller $e$ when in its lower sweep, so that when the needle is in its lowest position it will remain almost stationary for nearly half a turn of the cam E, or sufficiently long for the shuttle to make the one revolution necessary for forming the loop of the upper or needle thread around the lower or spool thread.

The needle-bar L is held in its proper position in the bearings $l'$ by means of a screw, $m$, passing through one of the bearings and entering a circumferential groove in the needle-bar.

N is a lever, pivoted at one end to a bracket, $n$, attached to the face-plate F, and provided with a curved slot, $n'$, in which works a pin, $m'$, attached to the slide M. The other end of the slotted lever N has a wire loop, $n^2$, to receive the thread. The upper thread, Z, runs from the spool O on the frame A to the wire loop $o'$ and the tension on the stationary tension-plate H, thence to the wire loop $n^2$ on the lever N, whence it passes through a loop, $s'$, carried by the crank-arm on the needle-bar, to the eye of the needle. On the descending of the needle the pin $m'$, working in the slot $n'$, vibrates the lever N upon its pivot, and first slowly, then rapidly, lowers the wire loop $n^2$, thereby producing the slack of the thread necessary for forming the loop around the shuttle to encircle the lower thread.

P is a cam-wheel for changing the position of the needle to produce a zigzag stitch. It consists of a small cylinder bored through its length to fit and revolve on a stud extending from the slide M. Across the outer end of this cylinder are cut, in this instance at right angles to each other, two grooves, $p'$, thus leaving four projections, $p^2$, alternating with the grooves $p'$. On the periphery of said cylinder are cut teeth, to form a ratchet, $p^3$.

R is a pawl, pivoted to the face-plate F at the side of the slide M, and provided with a cam-lever, $r'$, pivoted to the pawl R, impinging on the slide M, whereby the position of the said pawl may be changed at pleasure. Except for this adjustment, the pawl is stationary. This cam-lever $r'$, when set, as shown in Fig. 6, with the shortest radius of the cam turned toward the edge of the slide M, (indicated by the broken line,) allows the pawl R to drop into the teeth of the ratchet $p^3$, which, on the ascending of the slide M, will be moved against and partly revolved by the stationary pawl. When the cam-lever $r'$ is set in the position shown in Fig. 1, with its longest radius toward the edge of the slide M, the pawl R is thrown aside, so that the teeth of the ratchet $p^3$ will not come into contact with it, and hence will not impart motion to the gage-wheel P.

S is a crank fitted on the needle-bar L, and held there by a set-screw, $s^2$. To the crank S is fastened a long crank-pin, $s^3$, to the end of which is fastened a coil-spring, $s^4$, secured at the other end to the slide M, and holding said crank-pin in contact with the outer end of the gage-wheel. When the pawl R is thrown in the path of the teeth of the ratchet on the gage-wheel, the latter, through its grooves $p'$ and projections $p^2$, oscillates the crank S for each upward stroke of the slide M a distance equal to the depth of the grooves $p'$, and shifts the needle laterally a distance equal to the ratio of the eccentricity of the needle and that of the crank-pin relative to the center of the needle-bar L. The movement of the presser-foot and feed at the same time as the needle changes position produces the zigzag stitch. When the pawl R is shifted so as not to actuate the cam-wheel P a straight seam is produced.

T is the horn or post previously mentioned, being a metallic tube closed at the top, with the exception of an opening for the needle, and, preferably, flat on the top, so as to form a platform small enough to enter the little finger of a glove. This horn or post T contains a shuttle, X, and has an opening at the front of the upper portion for the insertion of the same, after which the opening is closed by a lid, U, fastened by a screw, $t'$, and further held in place by a spring, $t^2$, arranged at the lower end of the tube, and acting in such a manner that the lid may be opened by being slightly raised and then turned sidewise on the screw $t'$.

The lid U is provided at the upper end with a small thin projection, $u'$, which, when the lid is closed, projects slightly above the flat top or table of the tube T, directly in front of the needle, and serves to guide the seam, and also to divide the edges of the material in sewing a zigzag seam, as shown in Fig. 18.

The horn or post T is inclined in line with the needle, and has a flange at its lower end, by which it is screwed to a hollow or concave portion of the horizontal part of the frame A. Two parallel bars, V, extend from the flange through an opening in the frame and terminate with a cross-bar, $v'$, which serves as a bearing for the shuttle-carrier.

The shuttle-carrier W is a rod the upper part of which is inclosed in the horn or post T, and the lower part of which is provided, below the frame A, with a spiral groove or thread, $w$, of a large pitch and of just one turn, terminating at each end in a portion cut down flat to the depth of said groove, as shown at $w'$, Fig. 1.

The upper end of the carrier W is provided with a head fitted to revolve in the upper end of the horn or post T. This head has a small projection, $w^2$, which enters and fits loosely in a notch, $x$, in the lower end of the shuttle X, Fig. 14, so as to revolve the shuttle with the carrier W, and without separating them out of working order, so as to allow the loop of the upper thread, on being formed, to pass through under the shuttle between it and the head of carrier.

The shuttle-carrier is revolved by a rod or angular bar, C, raised and lowered by a crank upon the shaft B. A round bar, $c'$, clamped to the end of the bent rod C and made flat on one side, slides between one of the bars V and the adjacent portion of the carrier W, the flat side bearing against the bar V and the round side against the carrier W. While the bar $c'$ on its stroke slides on the flat portion $w'$ of the shuttle-carrier no movement of the latter is produced, but when it enters and slides through the groove $w$ the shuttle is caused to make one revolution and revolve again once in the opposite direction at the return stroke of the bar $c'$.

The shuttle X is cylindrical and hollow, and a portion of its surface at the lower end is cut away to form a thin broad hook, $x'$, for catching the thread off the needle and carrying it around with the shuttle to form a loop around the lower thread, $z'$, issuing from the spool in the shuttle through the slot $x^2$, and running twice again in and out through holes on the shuttle, as seen in the drawings in Figs. 9, 10, 12, 13, and 14.

Y is the spool, held on the stud in the shuttle by the small spring $y'$.

The forming of the loop and making the stitch is very plainly exhibited in Figs. 12 to 18, Fig. 12 showing the needle-thread just caught by the hook $x'$, the shuttle just started to revolve and form the loop, Fig. 13 showing the shuttle having completed its full motion and formed the loop ready to be drawn through between the shuttle and carrier-head by the upward movement of the needle, and Fig. 14 the loop of the needle-thread encircling the shuttle-thread and nearly tightened by the further upward progress of the needle.

A′ is a plate hinged to a stud pivoted to the frame A, and which may be swung partly around, raised up, and placed on the horn or post, as shown in dotted lines in Fig. 1, when it is desired to sew flat pieces only.

What I claim as my invention, and desire to secure by Letters Patent, is—

1. In a sewing-machine, the combination of a needle, a presser-foot, a rotary cam for imparting a longitudinal movement to said presser-foot in one direction, another rotary cam for imparting an oscillating movement to said presser-foot in one direction, springs for imparting a longitudinal and an oscillating movement to said presser-foot in the opposite directions, and an adjustable stop moving with said presser-foot and acting against a stationary part of the face-plate of the machine, to limit the oscillation of said presser-foot, substantially as specified.

2. In a sewing-machine, the combination of a face-plate, a needle-bar, means for reciprocating the same, devices for securing a needle eccentrically to the axis of said needle-bar, a crank carried by said needle-bar and provided with a crank-pin extending parallel with said needle-bar, a rotary cam carried bodily up and down with the needle-bar and provided with a ratchet wheel or teeth, and a pawl arranged to engage with said ratchet-wheel as the latter moves past it, thereby to effect the rotation of the cam-wheel and the oscillation of the needle-bar, substantially as specified.

3. In a sewing-machine, the combination of a face-plate, a needle-bar, means for reciprocating the same, devices for securing a needle eccentrically to the axis of said needle-bar, a crank carried by said needle-bar and provided with a crank-pin extending parallel with said needle bar, a rotary cam carried bodily up and down with the needle-bar and provided with a ratchet wheel or teeth, a pawl arranged to engage with said ratchet-wheel as the latter moves past it, thereby to effect the rotation of the cam-wheel and the oscillation of the needle-bar, and a cam-lever, whereby said pawl may be thrown out of the way of the ratchet-wheel and provision is afforded for oscillating the needle-bar at such times only as may be desirable, substantially as specified.

4. In a sewing-machine, the combination of a hollow horn or post adapted to enter articles to be sewed, a needle extending in the same direction as said horn or post and working through the tip thereof, a shuttle for operating in conjunction with said needle, and mechanism for operating said needle and shuttle, substantially as specified.

5. In a sewing-machine, the combination of a hollow horn or post extending in the same direction as the needle by which the sewing is to be done, adapted to enter the articles to be sewed and support them on its tip, a shuttle in said horn or post extending axially in the direction of the length of said horn or post, and means for imparting an oscillating motion to the shuttle, substantially as specified.

6. In a sewing-machine, the combination of a hollow horn or post extending in the same direction as the needle by which the sewing is to be done, and adapted to enter the articles to be sewed and support them on its tip, a shuttle extending axially in the direction of the length of said horn or post, a worm or screw imparting motion to the shuttle, a reciprocating rod imparting motion to said worm or screw, and means for reciprocating the said rod, substantially as specified.

7. The presser and feeder mechanism, consisting of the foot G and plate $g$, provided with the stationary block $g^2$, having toes $g^3$ $g^4$ and swiveled block $g'$, the face-plate F, having the inclined slot $f$, in combination with the cams D E, shaft B, the lifting hook or lever $i$, and shaft I, all constructed and operating substantially as specified.

8. The face-plate F, cam-wheel P, spring $s^4$, crank-pin $s^3$, and crank S, in combination with the needle-bar L, having the needle attached eccentrically, the slide M, and the stationary pawl and cam-lever R $r'$, all constructed and operating substantially as specified.

9. The shuttle-carrier W, constructed and arranged inside the tube T, as shown and described, in combination with the shuttle X, bar $c'$, bent rod C, and crank or eccentric for operating the latter, all operated and operating substantially as and for the purpose herein specified.

The above specification of my invention signed by me this 19th day of March, 1879.

HANS PETER HENRIKSEN.

Witnesses:
A. BORGEN,
ROBT. M. HOOPER.